United States Patent [19]

Elliott et al.

[11] Patent Number: 4,564,516

[45] Date of Patent: Jan. 14, 1986

[54] AMMONIA-BASED CATALYST FOR WATER-GAS SHIFT REACTION

[75] Inventors: Douglas C. Elliott, Richland; L. John Sealock, Jr., West Richland; Richard T. Hallen, Richland, all of Wash.

[73] Assignee: Gas Research Institute, Chicago, Ill.

[21] Appl. No.: 510,908

[22] Filed: Jul. 5, 1983

[51] Int. Cl.$^4$ .............................................. C01B 3/16
[52] U.S. Cl. ................................................... 423/655
[58] Field of Search ......................................... 423/655

[56] References Cited

U.S. PATENT DOCUMENTS

| | | | |
|---|---|---|---|
| 1,843,540 | 2/1932 | Casale | 423/655 |
| 3,150,931 | 9/1964 | Frank | 423/655 |
| 3,539,298 | 11/1970 | Fenton | 423/655 |
| 3,540,867 | 11/1970 | Baron et al. | 48/197 |
| 3,755,556 | 8/1973 | Aldridge | 423/655 |
| 4,161,393 | 7/1979 | Rudolph et al. | 423/655 |

FOREIGN PATENT DOCUMENTS 1074111 3/1980 Canada.

*Primary Examiner*—Howard S. Williams
*Attorney, Agent, or Firm*—Klarquist, Sparkman, Campbell, Leigh & Whinston

[57] ABSTRACT

The present invention is an improvement in the water-gas shift reaction in which an aqueous solution of ammonia or an ammonia yielding compound serves as a catalyst to increase the rate of, as well as shift the equilibrium toward, the production of hydrogen. The ammonia yielding compounds are preferably ammonium hydroxide or the weak acid salts of ammonia. Water for the reaction may be supplied by the solvent for the catalyst so that a separate source of steam is not required.

13 Claims, 4 Drawing Figures

500 ml CATALYST SOLUTIONS
o — NH$_4$OH (.344 mole)
△ — NH$_3$ GAS (.067 mole)
□ — (NH$_4$)$_2$CO$_3$ (.161 mole)

o    FIRST TEST, FIRST RUN
□    FIRST TEST, SECOND RUN
△    SECOND TEST, FIRST RUN
◇    SECOND TEST, SECOND RUN

AMMONIA-BASED CATALYST FOR WATER-GAS SHIFT REACTION

BRIEF SUMMARY OF THE INVENTION

The present invention involves the water-gas shift reaction, which utilizes the reaction of carbon monoxide and water in the presence of an ammonia based catalyst to yield carbon dioxide and hydrogen, according to the equation:

$$CO + H_2O = CO_2 + H_2$$

The water-gas shift reaction by which carbon dioxide and hydrogen are produced is well known in the chemical art. The primary use made of this reaction is in industrial applications to change the ratio of hydrogen to carbon monoxide in a given gas stream so that more efficient chemical synthesis can be achieved downstream. The original gas stream, which can come from a number of sources, will often have a hydrogen to carbon monoxide ratio other than that required in a given process, such as the 3 to 1 ratio required for methane synthesis or the 2 to 1 ratio required for methanol and Fischer-Tropsch synthesis. By processing the gas stream to change the ratio of its components, using the water-gas shift reaction, one can maximize the efficiency of the desired end process or synthesis.

As a secondary factor, production of pure hydrogen is a minor use, although a growing one, of the water-gas shift reaction. With increasing emphasis on energy self-sufficiency and the rising costs of energy, hydrogen gas is increasing in importance as a fuel source. It is important that the economics of the water-gas shift reaction be optimized by obtaining maximum hydrogen gas yields and production rates. Reaction temperature and choice of reaction catalysts are significant factors in the cost of producing hydrogen gas through the water-gas shift reaction.

Currently, two types of catalyst are widely employed: an iron oxide-chromium oxide catalyst system which is used at temperatures of 320°–450° C. and a zinc oxide-copper oxide catalyst which is used at temperatures of 175°–300° C. The latter system is easily poisoned by sulfur containing compounds. Various other catalysts have also been suggested.

Casale, U.S. Pat. No. 1,843,540, shows a reactor system using metals, metal oxides or metal salts in solution or in suspension as a catalyst for accelerating the water-gas shift reaction. The Casale disclosure is directed to the process being carried out at a temperature below the critical temperature of water and not less than 180° C. and at a pressure greater than the vapor pressure of water at the reaction temperature.

The catalysts currently used for the water-gas reaction are predominantly in a supported form in a fixed bed. A dissolved or aqueous catalyst would exhibit certain advantages in terms of reaction vessel design and handling of catalysts. An inexpensive, dissolved catalyst used to control the water-gas shift reaction within a range of temperatures and pressures would permit economical control of the ratio of hydrogen to carbon monoxide in a gaseous stream.

The present invention relates to a process by which an incoming gas stream containing carbon monoxide is reacted to give an outgoing gas stream enriched in hydrogen by employing the water-gas shift reaction. This reaction is carried out in the presence of an aqueous solution containing a catalytically effective amount of ammonia or compounds which will yield ammonia under the reaction conditions. The process is carried out at a temperature from 200° C. to the critical point of the catalyst containing solution. Pressure on the system must be sufficient to maintain the solution containing the catalytic amount of ammonia in the liquid phase.

The catalyst may be ammonia itself which can be admitted either with the entering gas stream or as a separate stream. It may also be ammonium hydroxide or an ammonium salt of a weak acid, such as ammonium carbonate or bicarbonate. Most typically, the ammonium salts will be those of weak acids having a pK of 2 or greater, preferably 5 or greater. The ammonia concentration in the catalyst solution, which is only broadly critical, should be at least 0.05 molar. The catalyst concentration will have some effect on the conversion efficiency of the incoming gas.

It is thus an object of the present invention to provide a process for shifting an incoming gas stream containing carbon monoxide to an outgoing gas stream enriched in hydrogen using a solution catalyst.

A further object is to provide a process for the water-gas shift reaction using ammonia and ammonia yielding compounds as catalysts.

Another object is to provide a process for the water-gas shift reaction using inexpensive and readily available catalysts.

A particular object is to provide, for an industrial process that employs the water gas shift reaction, a catalyst that is obtained as an inexpensive coproduct of the process.

These and many other objects will become readily apparent to those skilled in the art upon reading the following detailed description taken in conjunction with the drawings.

DETAILED DESCRIPTION

The present invention relates to an improvement in the water-gas shift process. This is a basic industrial chemical reaction in which carbon monoxide is reacted with steam to produce carbon dioxide and hydrogen. A catalyst is used to speed the reaction toward equilibrium to obtain a desired ratio of hydrogen to carbon monoxide. Solid catalysts, particularly the oxides of the difficultly reducible transition metals, are normally used on solid carriers to shift the equilibrium toward hydrogen production.

The present invention is a process using an aqueous solution of ammonia or an ammonia yielding compound for catalyzing the water-gas shift reaction. Ammonia has been found to be an effective and economical non-coking, low-temperature catalyst for adjustment of hydrogen/carbon monoxide concentrations in an incoming gas stream relatively higher in carbon monoxide. The shifted gas may be used as a fuel gas or a synthesis gas for carrying out various chemical reactions such as the production of methanol or ammonia. For the purposes of this invention a pressurized aqueous reactor 10, as shown in FIG. 1, may be used wherein the gas reactions can be carried out at relatively low temperatures, between 200° C. and the critical point, and at pressures at least as high as the vapor pressure of the catalyst solution at the particular reaction temperature chosen.

The term ammonia yielding compound should be interpreted to mean any compound which will yield ammonia in an aqueous system under the particular temperature and pressure chosen for the shift reaction. Typical of such compounds are ammonia gas, ammonium hydroxide, and the ammonium salts of weak acids, including ammonium carbonates and bicarbonates. Mixtures of these materials should be considered to be within the scope of the invention, as should mixtures of any of the present catalytic materials with other water soluble chemicals capable of catalyzing the water-gas shift reaction. Particular salts which have been found to be effective are ammonium carbonate and ammonium hydroxide. Compounds which are the ammonium salts of weak acids having a pK of 2 or greater have been found to be effective in the process, although the optimum salts are those of weak acids having a pK of 5 or greater.

Concentration of ammonia in the catalytic solution is only broadly critical. The ammonia concentration should be at least 0.05 molar and, for optimum efficiency, should be about 0.1 molar or greater.

Figure 1:
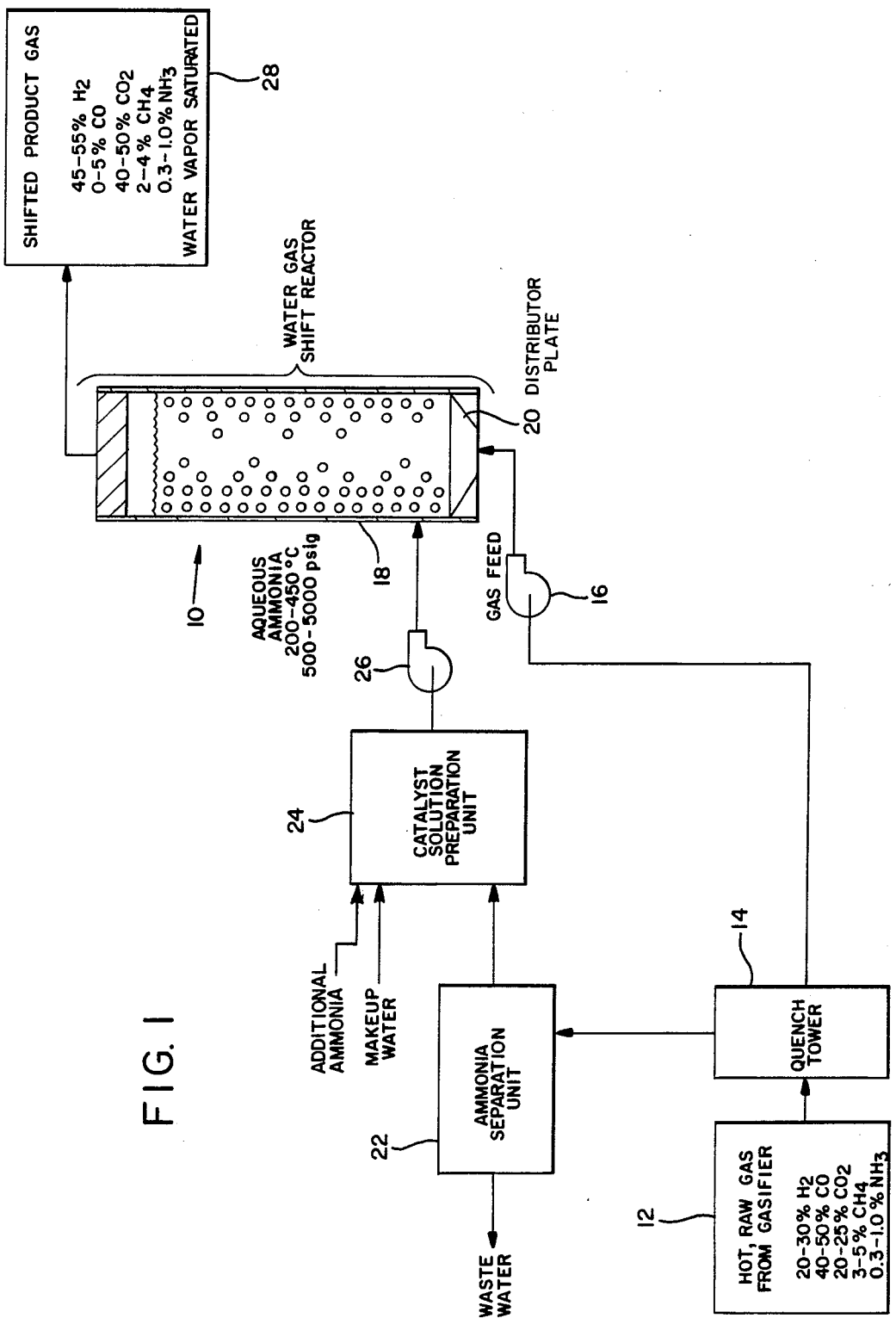
FIG. 1 is a schematic of a water-gas shift reactor using an ammonia catalyst system.

FIG. 1 is a block diagram outlining a series of unit processes which could be advantageously used with the present invention to shift the composition of a gas stream issuing from a coal gasification process. It will be understood that this particular gas stream is exemplary and should not be considered as limiting of the invention. However, FIG. 1 shows a particularly advantageous embodiment of the invention in that the catalyst needed for the water-gas shift reaction is obtained conveniently and inexpensively as a coproduct of the coal gasification process.

Typically, the gas from a coal gasifier will contain sufficient ammonia after removal of tar fractions so that no external source is needed to supply the ammonia need for the catalyst solution. The gas stream 12 from a coal gasifier is lead to a quench tower 14, e.g. a spray tower, where most of the ammonia will be removed. From this point the gas stream passes through a compressor 16 which feeds the gas into a reaction tower 18 through a distributor plate 20.

Liquid effluent from the quench tower may be used as a source of ammonia for commercial sale. But, all or part of the separated ammonia may be used in the preparation of a catalyst solution for use in the reactor 10. The liquid effluent is passed through an ammonia separation unit 22 wherein gaseous ammonia is separated from the liquid effluent. Waste water from the unit 22 is disposed of in an environmentally-acceptable manner or recycled to the quench tower 14. The gaseous ammonia is combined with clean water to prepare a catalyst solution in a liquid gas contactor 24. If insufficient ammonia is present in the incoming gas stream, an additional amount can be obtained from other sources and added during preparation of the catalyst solution. The catalyst solution is applied through an appropriate high head pump 26 to the shift reactor 10.

Gas coming into the reactor 10 bubbles upwardly through the reaction vessel 18 and through the aqueous solution of ammonia. As the gas rises, it reacts with the water in the reaction vessel 18, the reaction being catalyzed by the ammonia in the system. A shifted product gas 28 is drawn from the top of the reaction vessel 18. Some ammonia gas leaves the reactor 10 in the product gas 28 so that makeup catalyst solution must be added to the reactor continuously or periodically. The product gas 28 can be passed through another quench tower if recovery of the entrained ammonia is desired.

The reaction vessel shown in the drawing is meant to be exemplary of any of the well known gas/liquid contacting systems common in accepted chemical engineering practices. Among these could be mentioned bubble cap columns, packed columns, spray tower systems or other appropriate configurations which result in effective contacting and heat transfer between catalyst solution and gas.

In general, experimental work to date has shown that ammonia and ammonium yielding compounds have a strong catalytic effect in the water-gas shift reaction when used as an aqueous solution in a pressurized reactor. The water-gas shift reaction using ammonia or ammonium yielding compounds as catalysts is controllable and consistent. And, the conversion of carbon monoxide appears to be independent of the makeup of the initial gas charged to the reactor.

EXAMPLE 1

In order to study the effect of ammonia catalysts, an experimental reactor system was used wherein the water-gas shift reaction could be conducted at low temperatures (250° C.–450° C.) and high pressure (up to 5000 psig). The system comprised an autoclave from which gas samples could be taken several times throughout the period of an experiment, while the reaction temperature and pressure were maintained. More specifically, the test apparatus was a one-liter autoclave (Autoclave Engineers, Eria, PA) equipped with a turbine agitator (Dispersimax TM impeller, 1¼ in. diameter, driven by a Magnedrive TM drive mechanism) to contact the gas and liquid in the vessel. The autoclave was operated with standard electrical heating, cooling, and stirring equipment. A liner was fitted into the autoclave to facilitate product recovery and reactor cleanup.

The multiple sampling system used a body wall port for access to the top of the reactor for gas sampling. The autoclave and sample removal system were operated remotely after the reactor had been batch charged. A sample bulb was connected to the reactor system by a tubing union and isolated by an air-controlled, high pressure needle valve. When the reactor reached the proper conditions and a sample was required, the air-controlled valve was opened and a gas sample flowed from the port through the open valve into the sample bulb, which was monitored via a pressure gauge. After the sample was withdrawn, which required approximately one second, the valve was closed and the sample bulb was sealed and disconnected at the tubing union. The samples were typically withdrawn every fifteen minutes during experiments which lasted forty-five to sixty minutes at reaction temperature.

Since, periodically, a portion of the reaction mixture was withdrawn from the autoclave, the perturbation of that withdrawal and its effect on later samples must be considered. The effect of the sample removal was measured by replicating the experiments and sampling at different times during the experiments. Such tests were performed and the variances due to the sample removal found to be indistinguishable from the variances due to experimental error. The sample bulbs had an average volume of 111 ml and after sampling contain a sample of 10 to 40 ml of condensate at up to 650 psig of gaseous product pressure at ambient temperature. Typically, five samples were drawn during an experiment and a pressure drop within the reactor is noted. Mass balances of 85 to 95 percent were typical.

A series of experiments were performed in the autoclave with aqueous ammonia catalysts and carbon monoxide. 500 ml samples of three different catalyst solutions were formed by combining water with 0.067 mole of $NH_3$ gas, .344 mole of $NH_4OH$ and 0.161 mole of $(NH_4)_2CO_3$ respectively. In each run, one of the catalyst solution samples was placed in the autoclave, and the remaining volume was then filled with carbon monoxide (about sixteen liters). The contents of the sealed autoclave were heated to 300° C. with the pressure being allowed to rise to about 1700 psi, which levels were maintained throughout the run. When reaction temperature and pressure were reached, the turbine agitator was started to facilitate gas-liquid contact.

Figure 2:
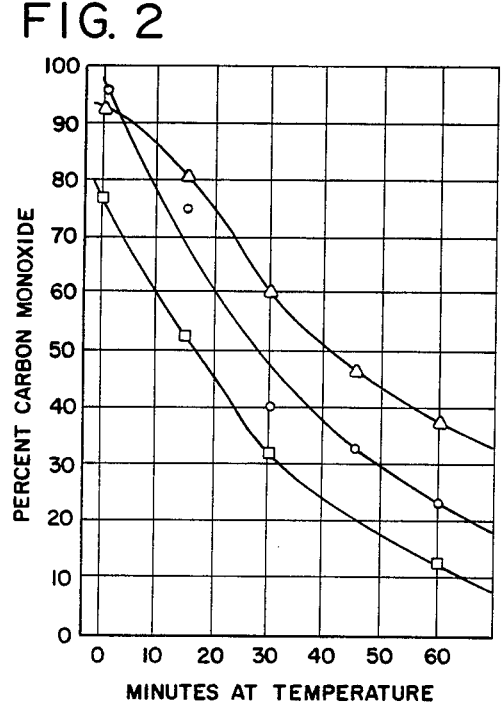
FIG. 2 is a graph showing reduction of carbon monoxide in the vapor phase vs. time at a reaction temperature of 300° C. for three different ammonia-based catalyst systems.

As shown in FIG. 2, the volume percent of carbon monoxide was reduced from 100% by conversion to carbon dioxide by the water-gas shift reaction and dilution with the hydrogen product gas. Significant amounts of the carbon monoxide had reacted in the time it took for the reactor to be heated to the reaction temperature of 300° C. The time at which the reactants first reached 300° C. is indicated as 0 time in FIG. 2.

As shown in FIG. 2, there was some effect on conversion efficiency due to the particular type and concentration of ammonia yielding compound in the sytem. The improvement in efficiency present in this system is shown dramatically by comparison with the results described in Example 2.

EXAMPLE 2

Figure 3:
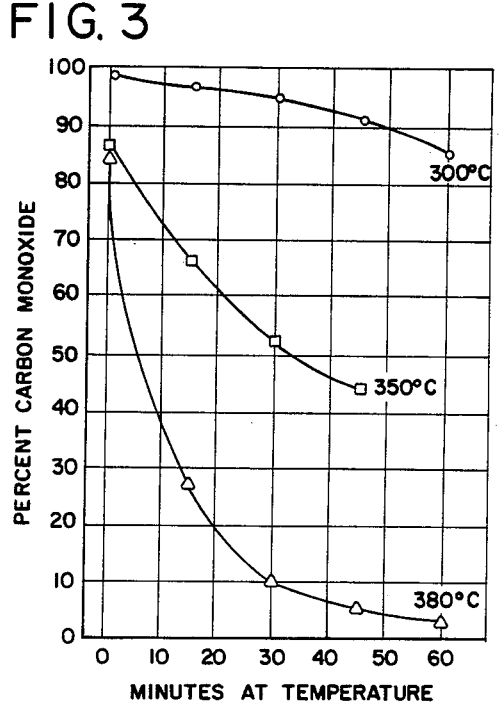
FIG. 3 is a similar graph showing reduction in carbon monoxide in the vapor phase vs. time at various reaction temperatures when no catalyst is employed.

A set of data, shown in FIG. 3, was generated from experiments similar to those described above except that no ammonia catalyst was present and that several different temperatures were used. The 300° C. curve indicates a much slower rate of conversion of carbon monoxide via the water-gas shift reaction when operating in the absence of the catalyst in comparison to the data for catalyzed reactions which appears in FIG. 2. FIG. 3 also shows that the apparent temperature effect on the kinetics of the reaction is significant, based on the relative rates of change in gas composition.

EXAMPLE 3

Figure 4:
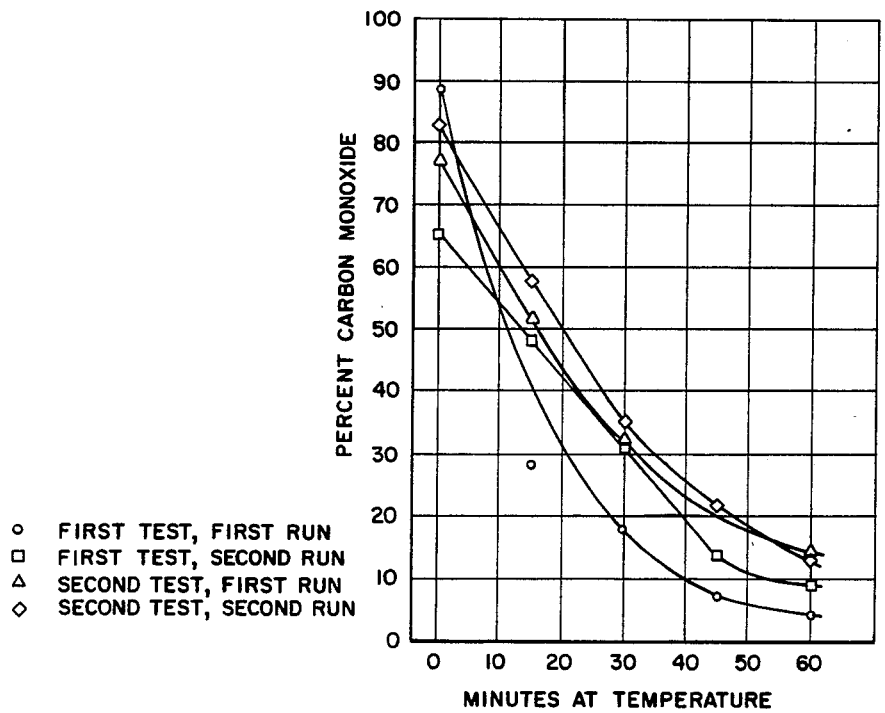
FIG. 4 is a similar graph showing reduction in carbon monoxide in the vapor phase vs. time at a reaction temperature of 300° C. for recycled ammonnium carbonate solution catalyst systems.

In addition to being inexpensive and readily available, ammonia catalysts are advantageous because they do not become poisoned or lose activity over time. This is demonstrated by FIG. 4 which shows the results from two types of recycle tests using an ammonium carbonate catalyst solution under the conditions described in Example 1.

In a first test, the catalyst solution was removed from the autoclave for analysis following an initial run and was then returned to the autoclave for a second run. Due to losses in handling and analysis, the second run had slightly less catalyst than the first which explains some of the reduction in catalytic activity. A sample of the catalyst solution following the first test yielded only a trace of solid material after drying in an oven at 115° C.

A second test with ammonium carbonate gave nearly as good results, but this time the catalyst solution was not removed from the autoclave between runs. Following the second run, a sample of catalyst solution was again evaporated to dryness, but this time the solution was kept at room temperature under a stream of nitrogen. Again, only a minute amount of solid was recovered and the infrared spectrum of the material pointed to a formate compound with possible carbonate contamination. The inability to recover ammonium carbonate is understandable since it decomposes at 58° C. according to the literature.

It will be understood by those skilled in the art that many chemical and process equivalents not disclosed in the preceding description will be within the scope of the invention. For example, another advantageous industrial embodiment of this invention is a synthesis of ammonia wherein hydrogen feed gas is prepared from reformed natural gas which must pass through a water-gas shift step. A portion of the product gas $NH_3$, is used to form a catalyst solution to replace the costly metal catalysts currently used for the shift reaction. The invention should thus be considered to be limited only by the following claims.

We claim:

1. A process for shifting an incoming gas stream containing carbon monoxide to an outgoing gas stream enriched in hydrogen using the water-gas shift reaction which comprises carrying out the reaction in the presence of an aqueous solution containing a catalytically effective amount of a catalyst that consists essentially of a material selected from the group consisting of ammonia, ammonia yielding compounds, and mixtures thereof.

2. The process of claim 1 in which the reaction is carried out at a temperature of at least 200° C.

3. The process of claim 2 in which the reaction is carried out at a temperature between 200° C. and the critical point of the aqueous solution.

4. The process of claim 1 in which the ammonia yielding compounds are selected from the group consisting of ammonium hydroxide, ammonium salts of weak acids, and mixtures thereof.

5. The process of claim 4 in which the ammonium salts are selected from ammonium carbonate and ammonium bicarbonate.

6. The process of claim 4 in which the ammonium salts are those of weak acids having a pK of 2 or greater.

7. The process of claim 4 in which the ammonium salts are those of weak acids having a pK of 5 or greater.

8. The process of claim 1 in which the ammonia concentration in the solution is at least 0.05 molar.

9. The process of claim 8 in which the ammonia concentration in the solution is at least 0.1 molar.

10. A process for shifting a stream of coal gasifier effluent gas, which contains carbon monoxide and ammonia, to a gas stream enriched in hydrogen, the process comprising:

providing, in an aqueous solution, a catalytically effective amount of a catalyst material that consists essentially of ammonia, at least part of the ammonia being acquired from a stream of coal gasifier effluent gas, which contains carbon monoxide and ammonia; and reacting the carbon monoxide in the stream of coal gasification effluent gas with water according to the water-gas shift reaction in the presence of the catalyst solution to provide a gas stream enriched in hydrogen.

11. A process for shifting a stream of coal gasifier effluent gas, which contains carbon monoxide and ammonia, to a gas stream enriched in hydrogen, the process comprising:

providing an aqueous catalyst solution that contains a catalytically effective amount of ammonia, at least a portion of which is acquired from a stream of coal gasifier effluent gas which contains carbon monoxide and ammonia, by a. contacting the stream of coal gasifier effluent gas with water to separate ammonia from the stream, b. separating the ammonia from the water to obtain at least a portion of the catalytically effective amount of ammonia, and c. combining the ammonia with clean water to form the catalyst solution; and reacting the carbon monoxide in the stream of coal gasification effluent gas with water according to the water-gas shift reaction in the presence of the catalyst solution to provide a gas stream enriched in hydrogen.

12. The process of claim 11 catalyzed only by a material that consists essentially of ammonia, ammonia yielding compounds, or mixtures thereof.

13. A process for shifting an incoming gas stream containing carbon monoxide to an outgoing gas stream enriched in hydrogen using the water-gas shift reaction which comprises carrying out the reaction in the presence of an aqueous solution containing a catalytically effective amount of a catalyst that consists essentially of a material selected from the group consisting of ammonia, ammonia yielding compounds, and mixtures thereof, the process being carried out at a temperature of at least 200° C. with the solution having at least 0.1 molar concentration of ammonia.

* * * * *